US008096565B2

(12) United States Patent
Meers

(10) Patent No.: US 8,096,565 B2
(45) Date of Patent: Jan. 17, 2012

(54) ROLL OUT CART

(75) Inventor: Ryan C. Meers, Los Angeles, CA (US)

(73) Assignee: Rehrig Pacific Company, Los Angeles, CA (US)

(*) Notice: Subject to any disclaimer, the term of this patent is extended or adjusted under 35 U.S.C. 154(b) by 252 days.

(21) Appl. No.: 11/942,593

(22) Filed: Nov. 19, 2007

(65) Prior Publication Data

US 2009/0127809 A1 May 21, 2009

(51) Int. Cl.
*B62B 1/16* (2006.01)

(52) U.S. Cl. .................. 280/47.26; 280/47.17; 220/671; 220/908; 220/810

(58) Field of Classification Search .......... 220/831-832, 220/913, 671, 335, 337, 810, 380, 908, 770; 280/47.26, 47.17

See application file for complete search history.

(56) References Cited

U.S. PATENT DOCUMENTS 3,384,385 A 5/1968 Cohen et al.
4,946,059 A 8/1990 Rehrig
D311,983 S 11/1990 Rehrig
4,988,010 A * 1/1991 Pollak ........................... 220/503
5,031,796 A * 7/1991 Schafer et al. ................ 220/571
5,071,024 A * 12/1991 Delmerico et al. ........... 220/832
5,088,750 A * 2/1992 Beese et al. ................ 280/47.26
D347,095 S * 5/1994 Apps et al. ....................... D34/5
D388,577 S 12/1997 Rehrig et al.
D398,120 S 9/1998 Rehrig et al.
5,886,068 A * 3/1999 Prout et al. .................... 523/220
D410,125 S 5/1999 Rehrig et al.
5,899,468 A 5/1999 Apps et al.
D423,169 S 4/2000 Apps et al.
D445,228 S 7/2001 Apps et al.
6,276,557 B1 * 8/2001 Wysocki ....................... 220/608
6,280,001 B1 * 8/2001 Parker et al. .................. 301/112
D476,125 S 6/2003 Chen
6,708,824 B2 * 3/2004 Sahm, III ...................... 206/505
7,114,631 B2 10/2006 Aiken et al.
7,121,564 B2 10/2006 Hassell
7,185,783 B1 * 3/2007 Miller ........................... 220/675
7,287,665 B2 10/2007 Meissen et al.
2002/0158068 A1 10/2002 Panek, Jr.
2009/0127809 A1 * 5/2009 Meers ........................ 280/47.26

* cited by examiner

*Primary Examiner* — J. Allen Shriver, II
*Assistant Examiner* — Erez Gurari
(74) *Attorney, Agent, or Firm* — Carlson, Gaskey & Olds

(57) ABSTRACT

A roll-out cart includes a bottom wall having front, rear and side walls extending upwardly to define an upper interior. The rear wall is taller than the front wall and each of the side walls has an upper edge angled downwardly from the rear wall to the front wall. At least one support extends upwardly and rearwardly from an upper end of the rear wall to a handle. A base portion extending downwardly from the bottom wall includes a plurality of base walls including side portions each having corrugated portions below the side walls.

43 Claims, 12 Drawing Sheets

ROLL OUT CART

BACKGROUND OF THE INVENTION

This invention relates generally to roll-out carts, such as are used for trash or recycling.

Known roll-out carts generally include front, rear and side walls extending upward from the perimeter of a bottom wall to define an interior. Wheels are mounted rotatably at a lower end of the rear wall. A handle extends from an upper end of the rear wall, such that the roll-out cart can be tipped back onto the wheels and pulled by the handle. A lid is hingeably connected to an upper edge of the rear wall.

In order to reduce volume of the container for recycling, one known roll-out cart includes a "false" bottom, defining the interior of the container in only the upper half of the roll-out cart. However, this known roll-out cart is inconvenient for the user to handle and is not well-suited for use with automated handling equipment.

SUMMARY OF THE INVENTION

A roll-out cart according to one embodiment of the present invention includes a bottom wall having front, rear and side walls extending upwardly to define an upper interior. The rear wall is taller than the front wall and each of the side walls has an upper edge angled downwardly from the rear wall to the front wall. At least one support extends upwardly and rearwardly from an upper end of the rear wall to a handle. This arrangement, while reducing volume, lowers the height of the volume while maintaining a convenient height of the handle and providing an aesthetically pleasing appearance.

A base portion extending downwardly from the bottom wall includes a plurality of base walls including side portions each having corrugated portions below the side walls. The corrugated portions reinforce the base, making the roll-out cart more suitable for automated handling equipment.

These and other features of the application can be best understood from the following specification and drawings, the following of which is a brief description.

DETAILED DESCRIPTION OF THE PREFERRED EMBODIMENTS

Figure 1:
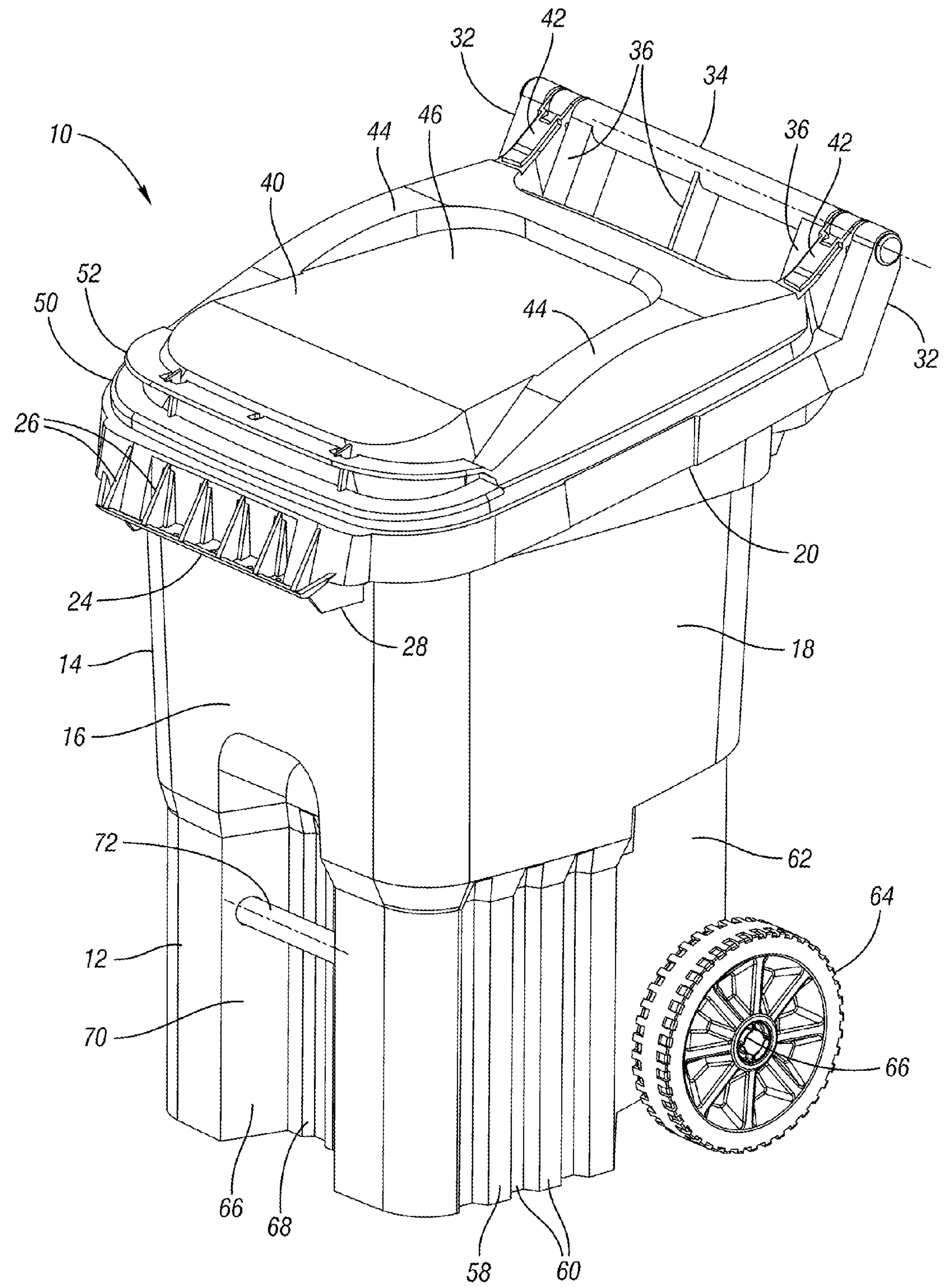
FIG. 1 is a perspective view of a roll-out cart according to one embodiment of the present invention.

FIG. 1 illustrates a roll-out cart 10 according to a first embodiment of the present invention. The roll-out cart 10 includes a base portion 12 and an upper portion 14. The upper portion 14 includes a front wall 16 and opposed side walls 18. A lip 20 protrudes outwardly and then downwardly from the upper edges of the front wall 16 and side walls 18. A front flange 24 extends downwardly from the front of the lip 20 and is reinforced by upper gussets 26 connected to the lip 20 and the lower gussets 28 connected to the front wall 16. The lip 20 is continuous with a pair of supports 32 extending upwardly and rearwardly of the rear of the container. A handle 34 is secured to the supports 32 and is further supported by gussets 36.

A lid 40 is hingeably secured to the handle 34 by arms 42. The lid 40 includes a pair of side reinforcement portions 44 and a generally planar central portion 46. The side reinforcement portions 44 each include a convexly curved upper wall and generally vertical walls extending downward therefrom. The side reinforcement portions 44 increase the rigidity of the lid 40 and assist water in draining from the lid 40, while providing an aesthetically pleasing appearance. The lid 40 also includes a peripheral flange 50 that rests on the upper edges of the front wall 14 and side walls 18 when closed. A front flange 52 protrudes forwardly from a forward end of the lid 40 spaced upwardly from the peripheral flange 50. The front flange 52 acts as a handle to assist in opening the lid 40. Optionally, a latch could be attached or integrated with the forward end of the lid 40.

The walls of the base portion 12 have lowermost edges that rest on the ground. Because the floor 92 (FIG. 7) of the roll-out cart 10 is positioned away from the lower edge of the base portion 12, the floor 92 does not sufficiently reinforce the base portion 12, especially toward the lowermost edges of the base portion 12. Therefore the base portion 12 includes corrugated side portions 58 each having vertically extending corrugations 60. The walls of the side portions 58 are corrugated to increase the strength and stiffness so that they can be handled with automated handling equipment, which may drop the roll-out cart 10 onto the base portion 12 and may push and slide the roll-out cart 10 on the ground. The automated handling equipment may also occasionally clamp onto the side portions 58 of the base portion 12. The corrugations in the side walls 58 thus reinforce the side walls 58.

The base portion 12 further includes a rearward portion 62 that is narrower than the side portions 58. Wheels 64 are secured through the rear portion 62 of the base portion 12 via an axle 66 extending through the walls of the rear portion 62. The wheels 64 protrude outwardly farther than the side portions 58 so that the automated handling equipment will catch onto the wheels 64 of an inverted roll-out cart 10 if the roll-out cart 10 otherwise starts to slip.

The base portion 12 further includes a front recess 66 having a front wall 68 also having vertical corrugations formed therein. The recess 66 is also defined by side walls 70. A cylindrical tube or other suitable handle 72 is inserted through holes formed in the side walls 70. The handle 72 and front flange 24 are configured to engage automated handling equipment which lift and invert the roll-out cart 10.

Figure 2:
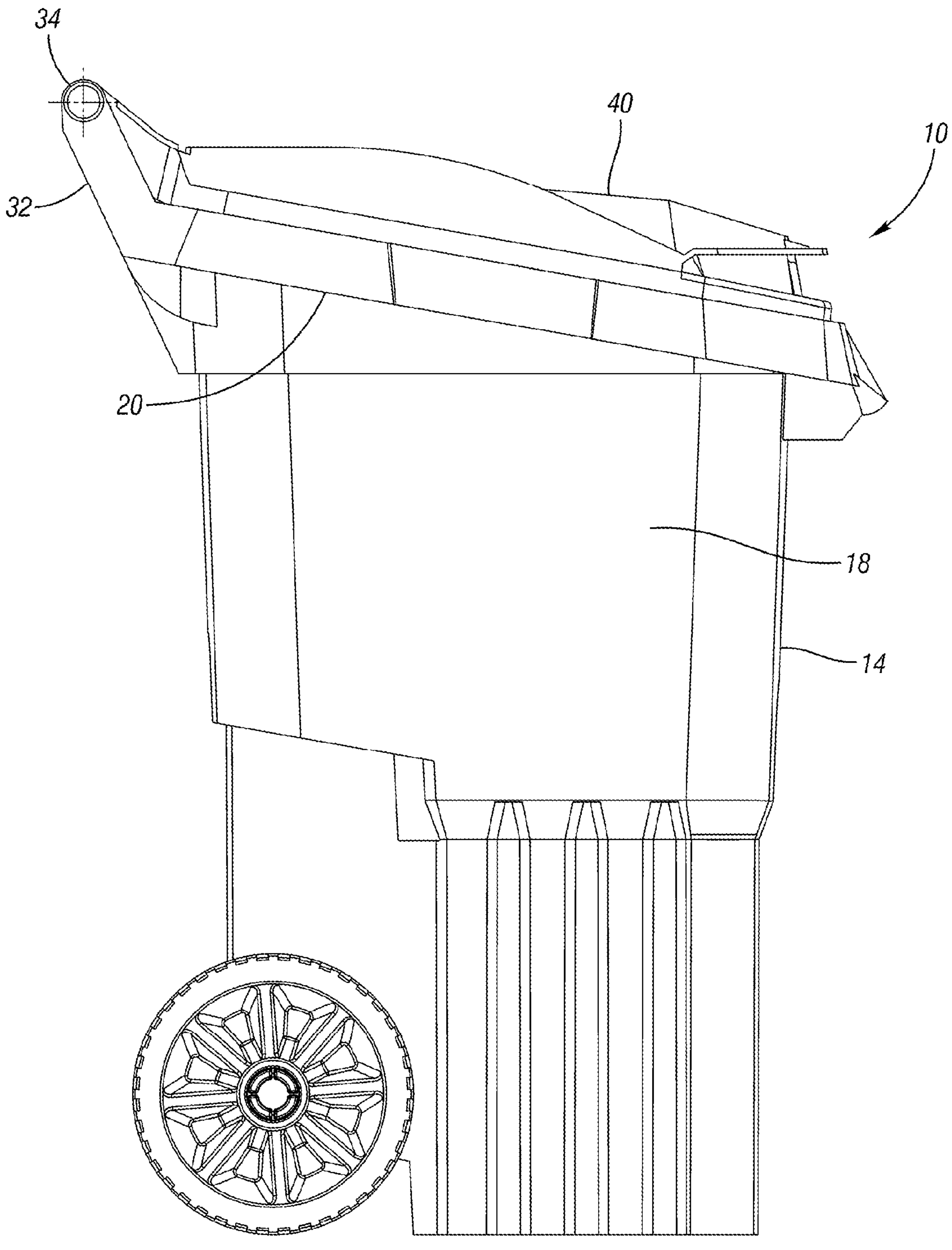
FIG. 2 is a side view of the roll-out cart of FIG. 1.

As shown in FIG. 2, the upper edges of the side walls 18 are angled downwardly from the rear of the roll-out cart 10 to the front of the roll-out cart 10 at approximately an angle between approximately five degrees and approximately fifteen degrees, and preferably approximately ten degrees. The supports 32 then extend upwardly and rearwardly at a steeper angle, for example, approximately sixty degrees, as shown, to the handle 34. The angled handle supports 32 and angled side walls 18 reduce the volume of the upper interior of the upper portion 14 of the roll-out cart 10, while lowering the center of gravity of any material stored therein and while maintaining the handle 34 at a convenient height (i.e. sufficiently high).

Figure 3:
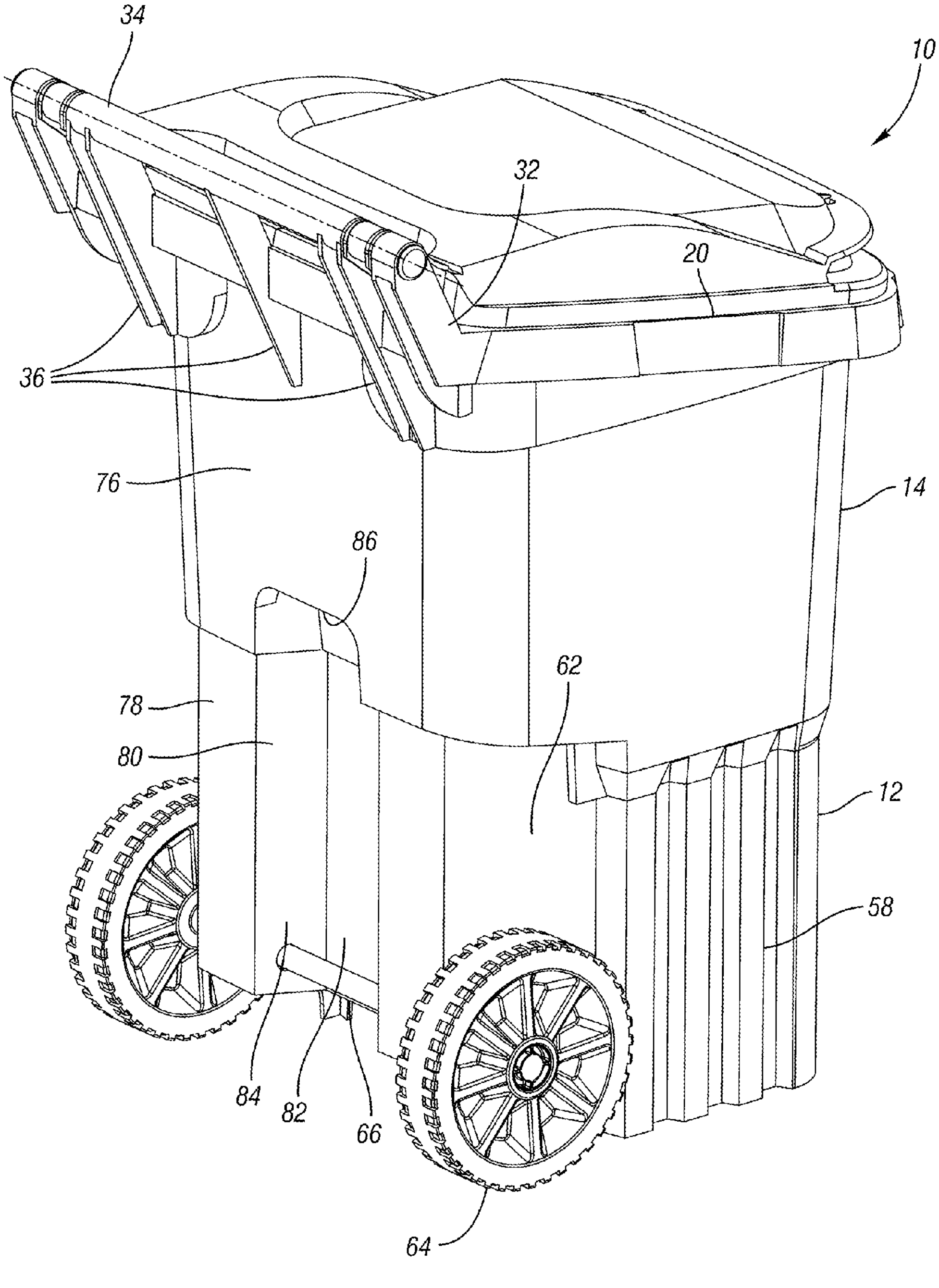
FIG. 3 is rear perspective view of the roll-out cart of FIG. 1.

FIG. 3 is a rear perspective view of the roll-out cart 10. The gussets 36 extend from the handle 34 to a rear wall 76 of the upper portion 14. The base portion 12 includes a rear wall 78 in which is formed a rear recess 80 having a back wall 82 and side walls 84 through which the axle 66 is inserted. A handle 86 is formed by a downwardly extending flange protruding into the recess 80.

Figure 4:
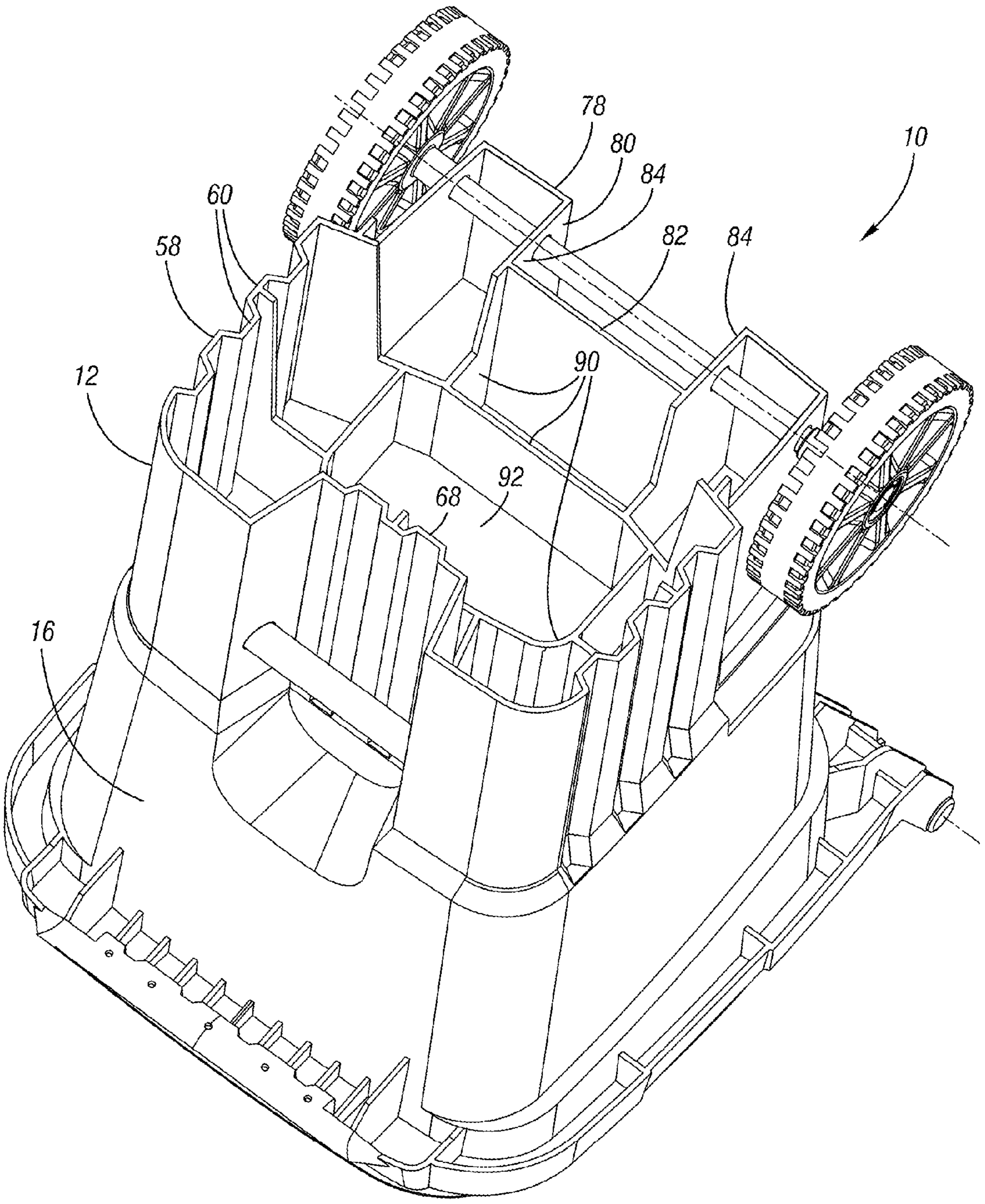
FIG. 4 is bottom perspective view of the roll-out cart of FIG. 1.

FIG. 4 is a bottom perspective view of the roll-out cart 10. The walls of the base portion 12 (including side portions 58, front wall 68, back wall 82 and side walls 84) are connected by cross-ribs 90, which extend downward from the floor 92. The cross-ribs 90 reinforce the floor 92 and the walls of the base portion 12.

Figure 5:
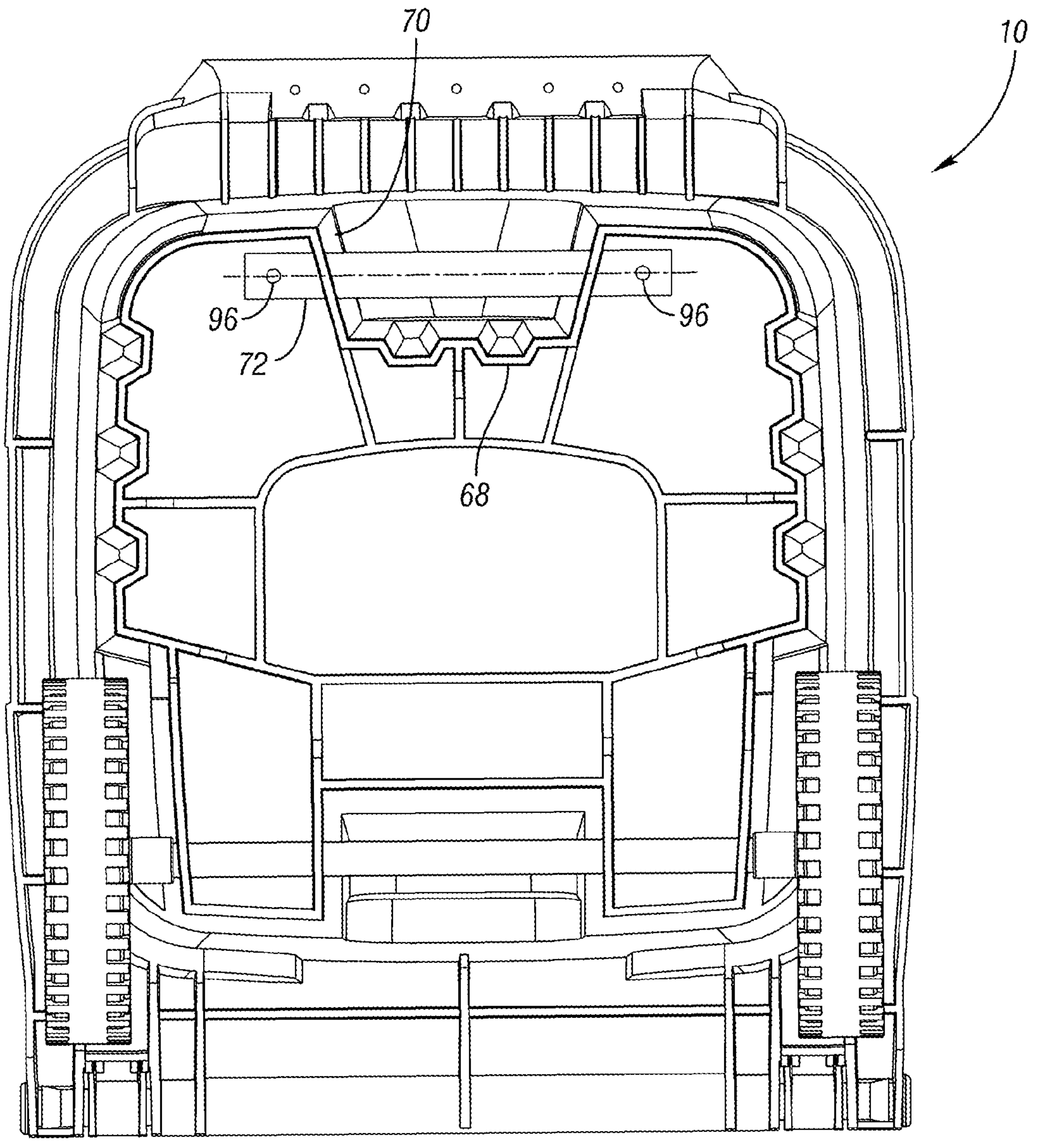
FIG. 5 is a bottom view of the roll-out cart of FIG. 1.

FIG. 5 is a bottom view of the roll-out cart 10. The handle 72 is inserted through holes in the side walls 70 and can be secured with pins (not shown) through apertures 96 near opposite ends of the handle 72.

Figure 6:
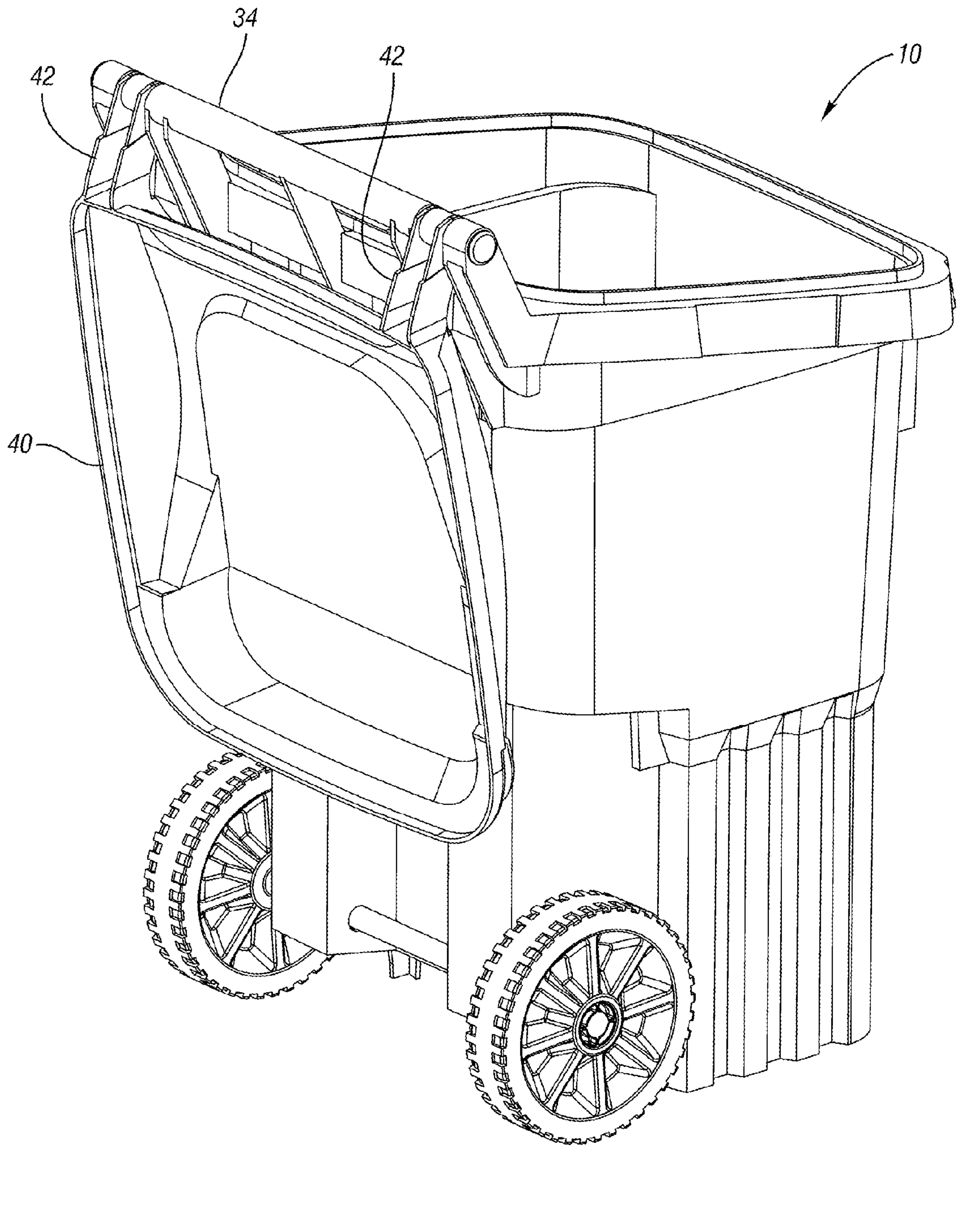
FIG. 6 is a rear perspective view of the roll-out cart of FIG. 1 with the lid open.
Figure 7:
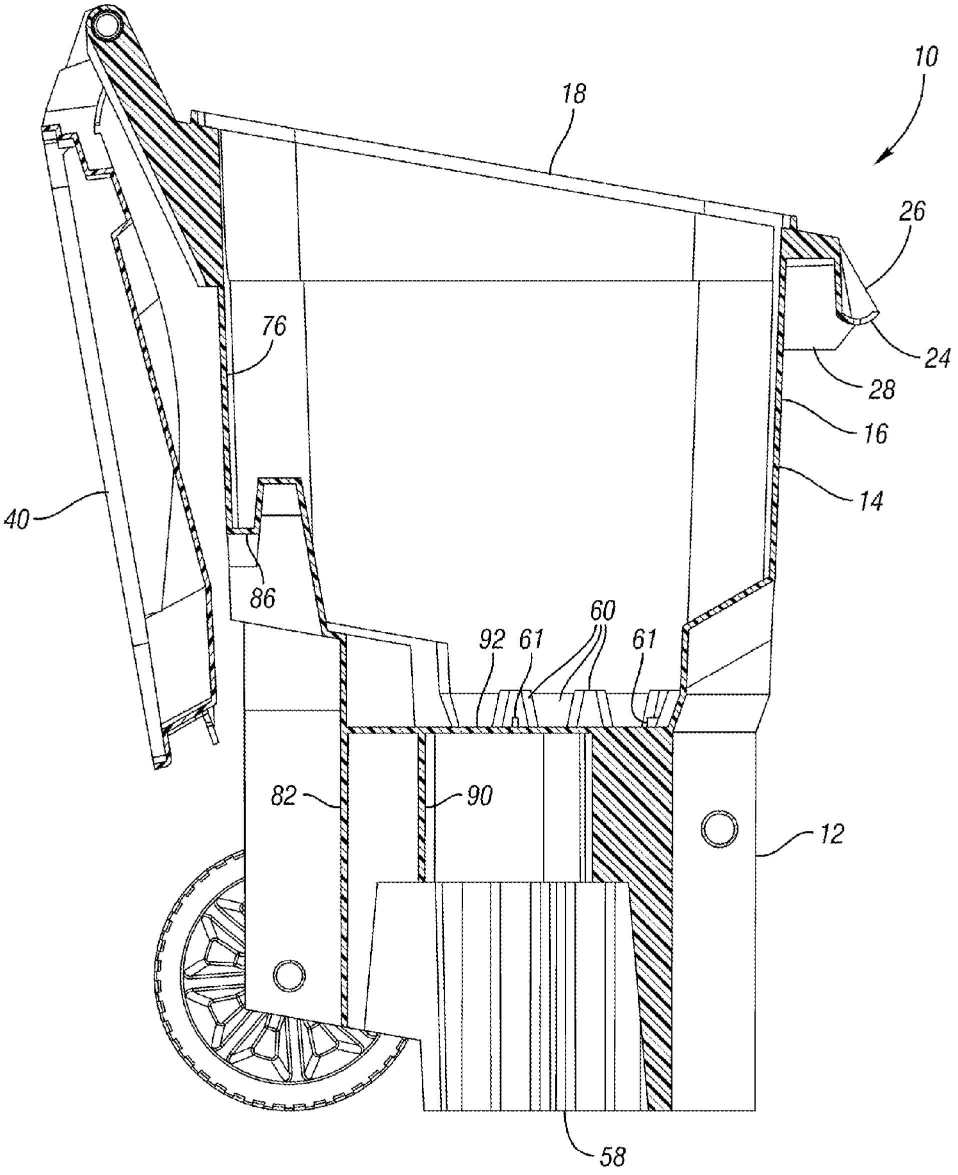
FIG. 7 is a section view through the roll-out cart of FIG. 6.

As shown in FIG. 6, the lid 40 can be pivoted back over the handle 34 to a position where it hangs from the handle 34 by the arms 42. A section view through the open roll-out cart 10 is shown in FIG. 7. The floor 92 separates the upper portion 14 from the base portion 12 and defines the upper interior of the roll-out cart 10. The floor 92 extends from the front wall 16 to the rear wall 76 and defines the rear handle 86. The corrugations 60 extend partially upward of the floor 92 into the upper portion 14. Nesting ribs 61 are formed on the interior surface of some of the corrugations 60 to limit the nesting of a similar roll-out cart therein.

Figure 8:
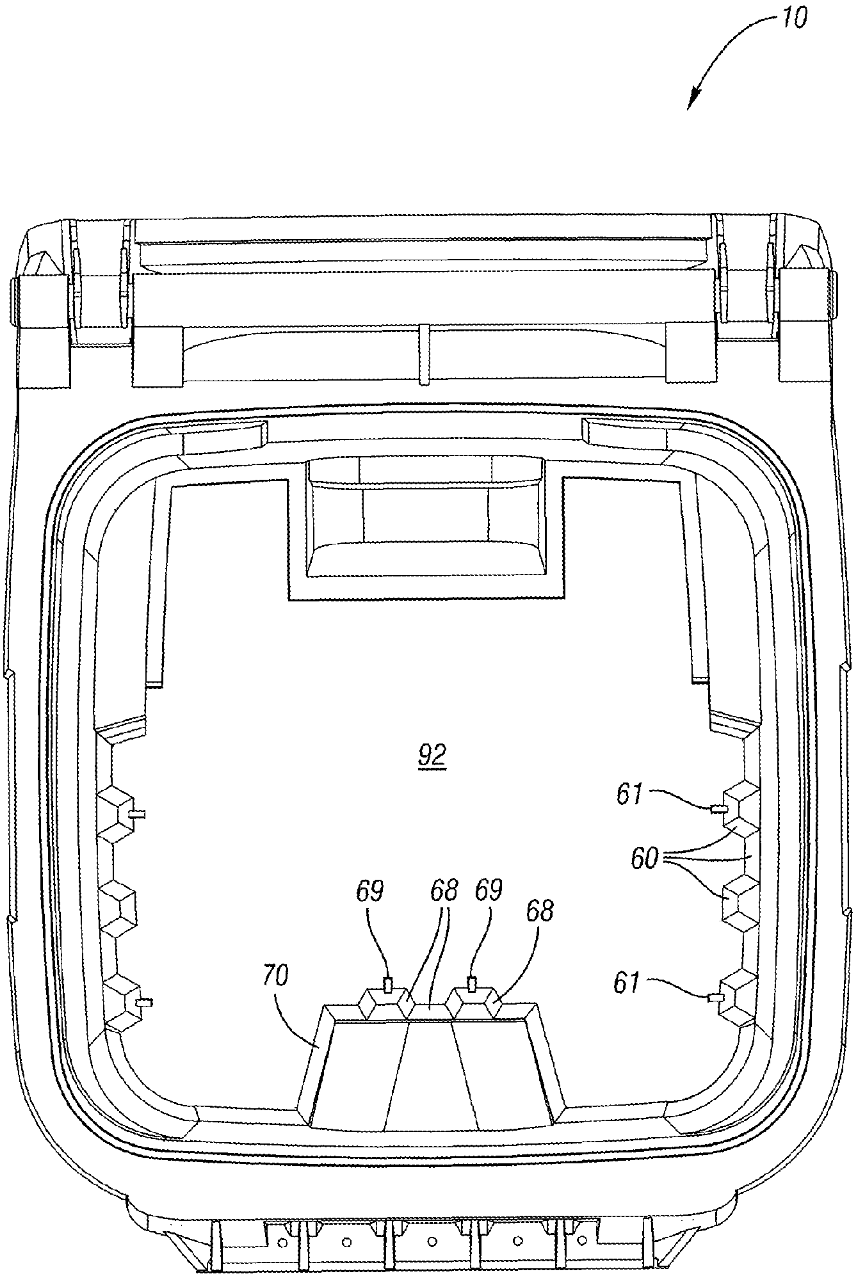
FIG. 8 is a top view of the roll-out cart of FIG. 6.

FIG. 8 is a top view of the open roll-out cart 10. Additional nesting ribs 69 are formed on the interior surfaces of some of the corrugations in the front wall 68. These nesting ribs 69 also limit nesting of a similar roll-out cart nested in the upper interior of the roll-out cart 10.

Figure 9:
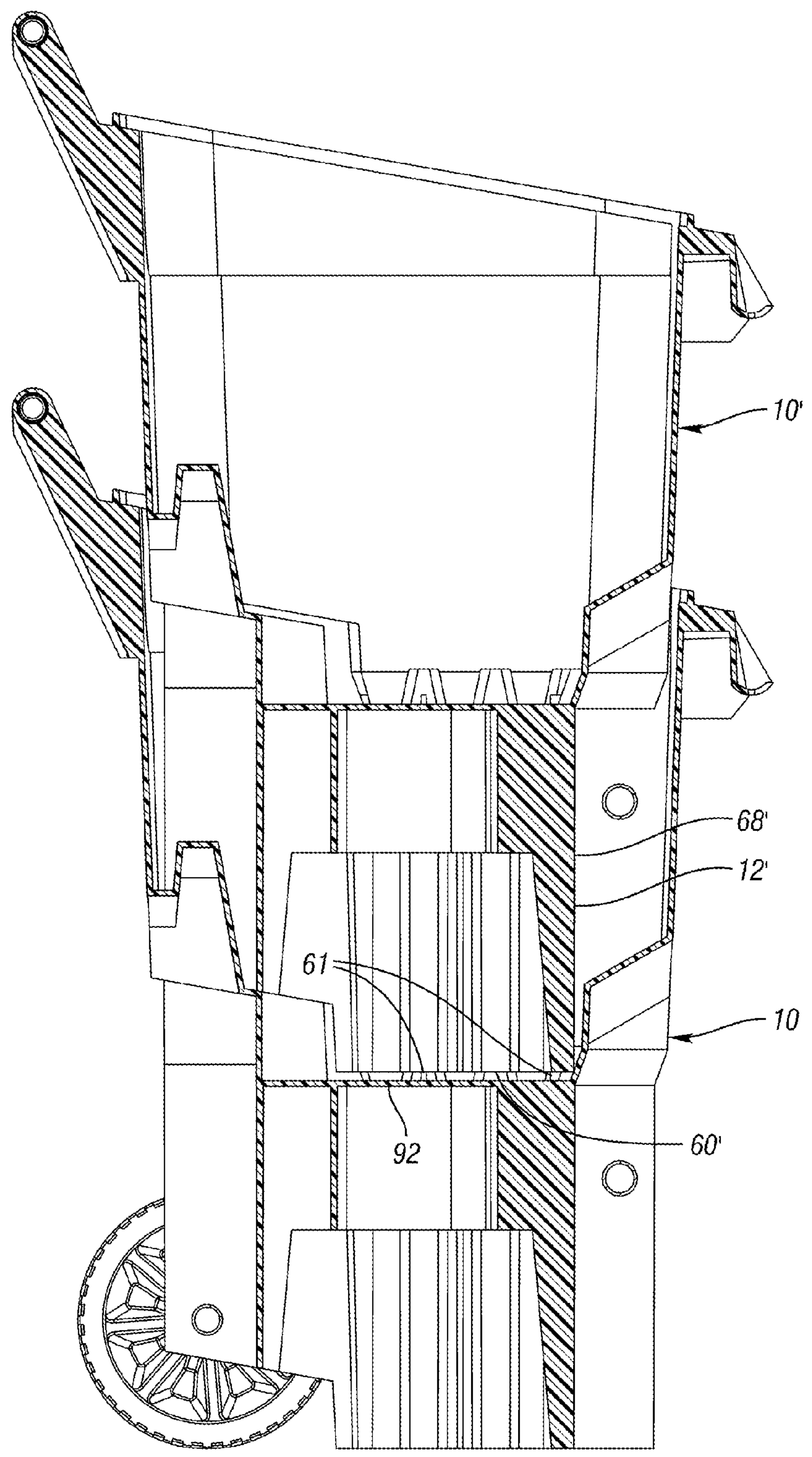
FIG. 9 is a view similar to that of FIG. 7 with a similar cart nested therein.

FIG. 9 is a section view through nested roll-out carts 10, 10'. As shown, the nesting reduces the overall volume occupied by the two roll-out carts 10, 10'. In practice, many roll-out carts 10, 10' would be nested for shipping. The wheels and axles (not shown) can fit in the upper interior of the lower roll-out cart 10 and within the base portion 12' of the upper roll-out cart 10' when nested. The nesting is limited by the nesting ribs 61 and nesting ribs 69 (not shown).

Figure 10:
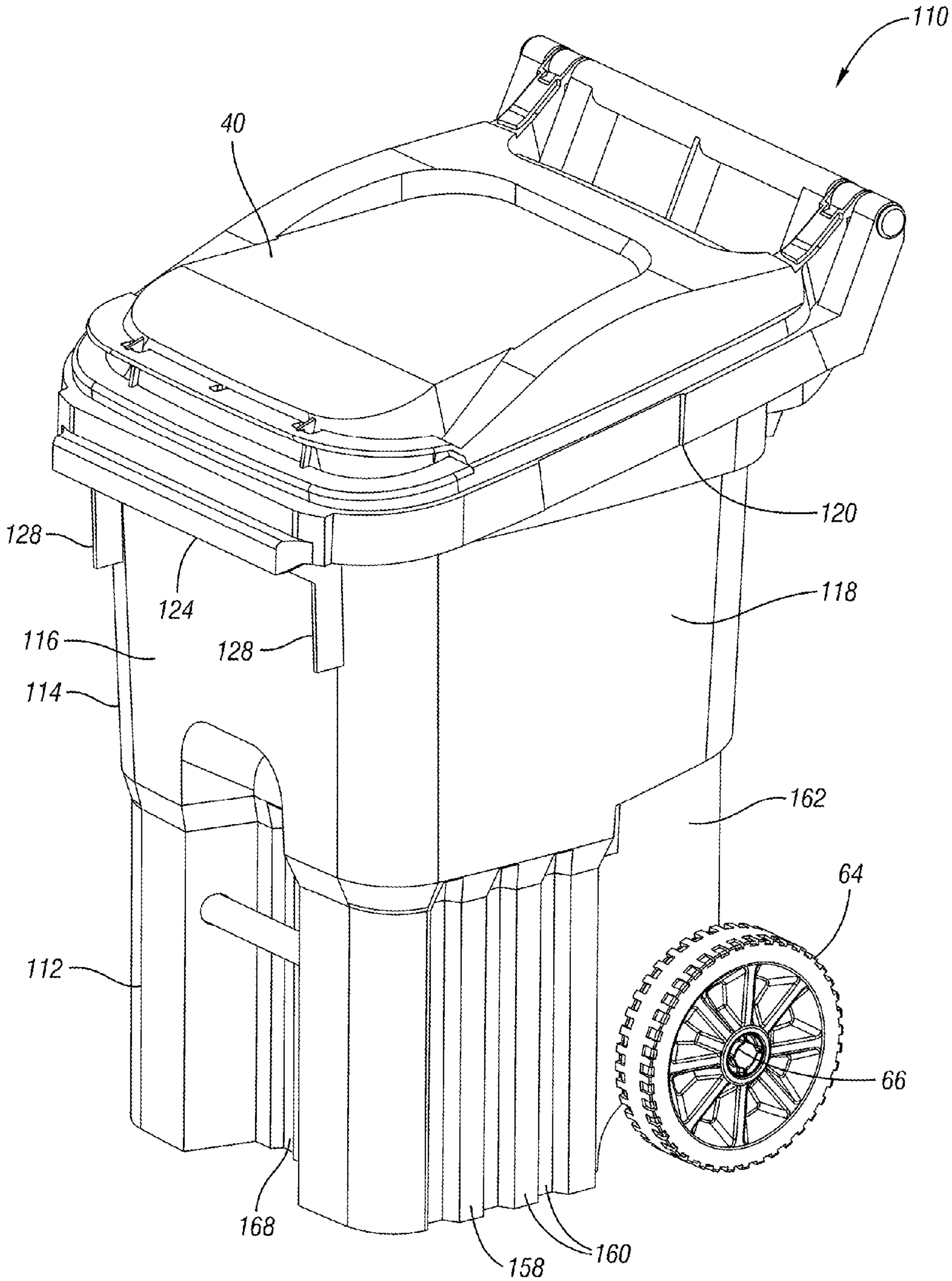
FIG. 10 is a perspective view of a roll-out cart according to a second embodiment of the present invention.
Figure 11:
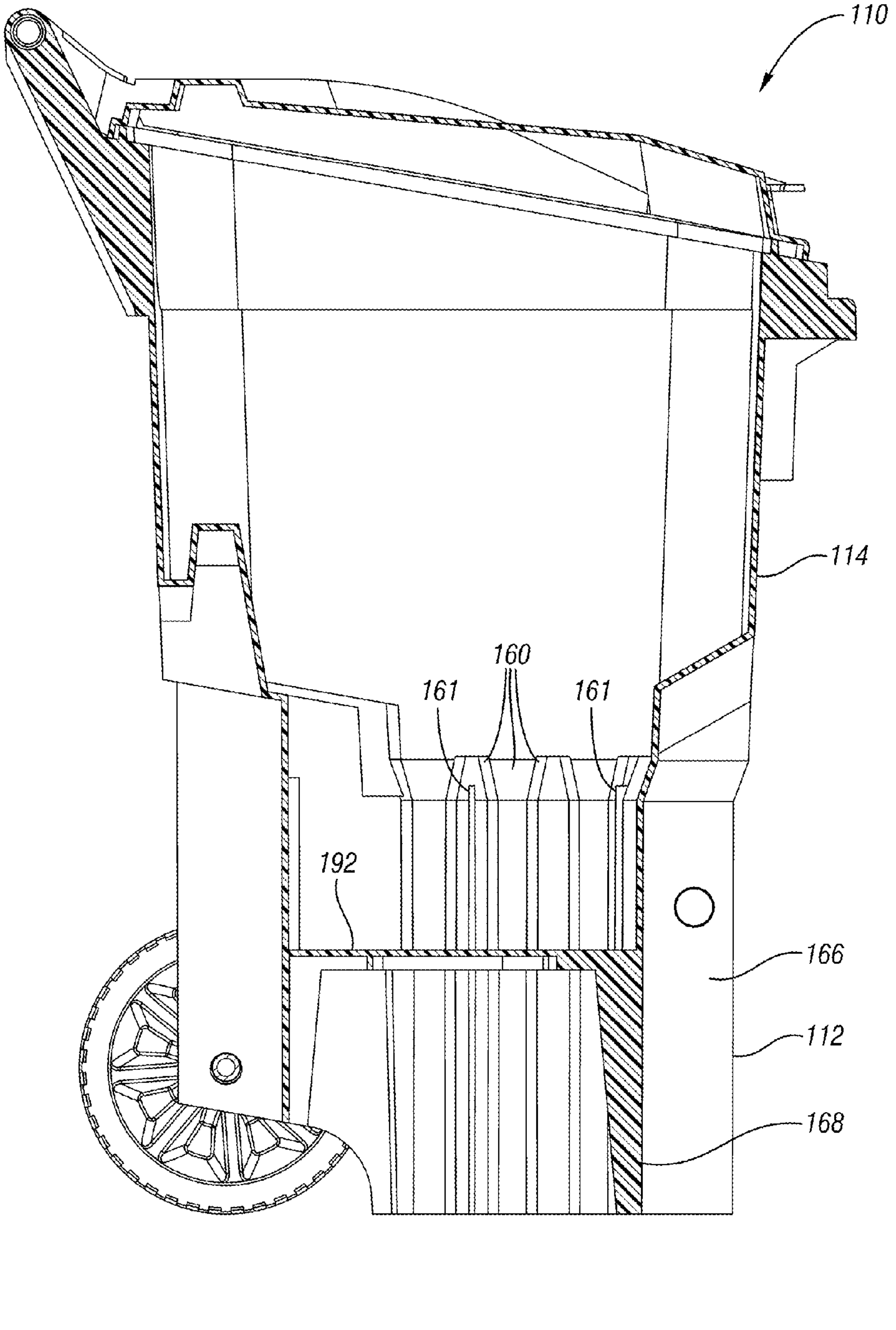
FIG. 11 is a section view through the roll-out cart of FIG. 10.
Figure 12:
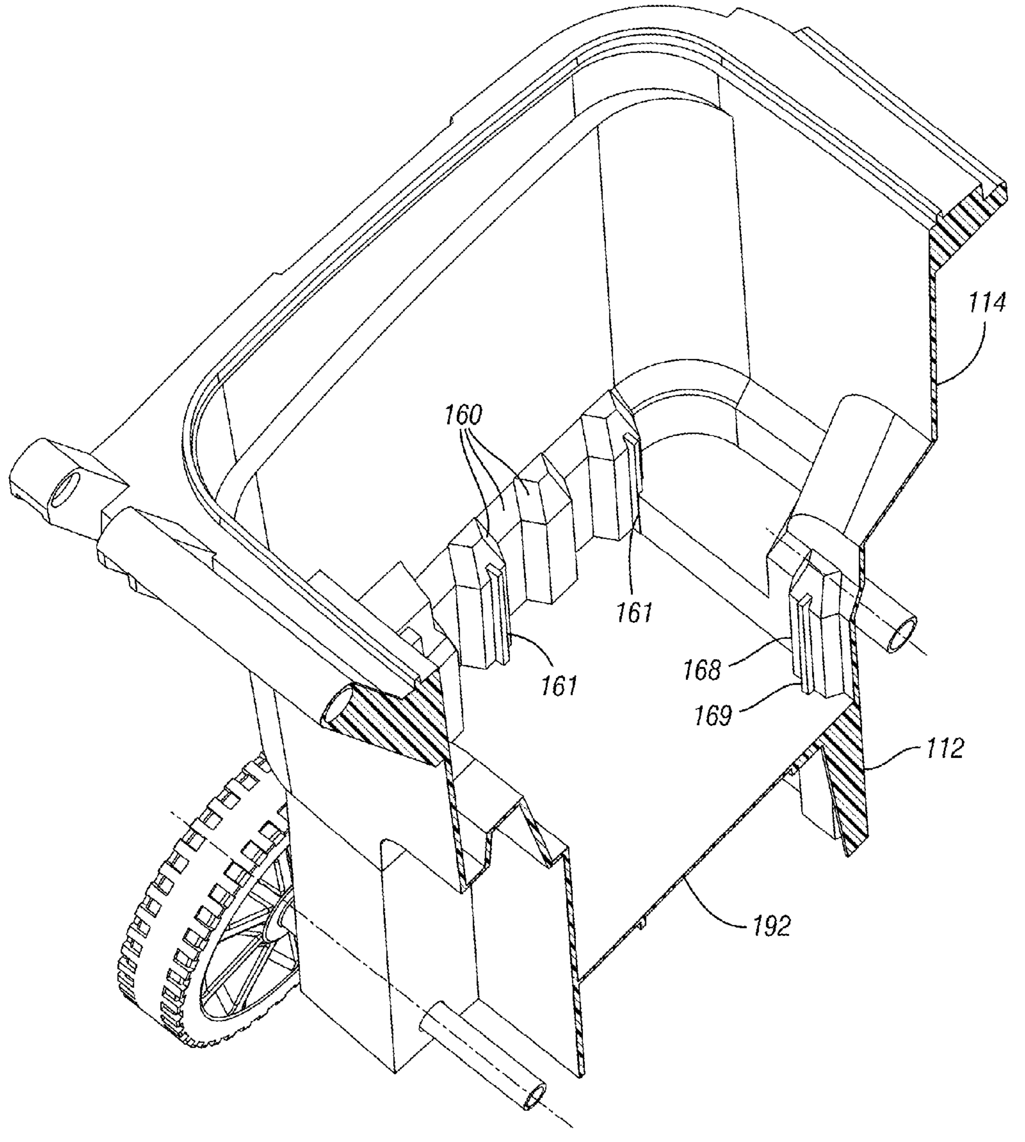
FIG. 12 is a rear perspective view of the roll-out cart of FIG. 10 partially broken away.

A roll-out cart 110 according to a second embodiment of the present invention is shown in FIGS. 10-12. The roll-out cart 110 is identical to the roll-out cart 10 of FIGS. 1-9 except as specifically shown or described. Corresponding components will be referenced with corresponding reference numerals with a "1" preappended. The roll-out cart 110 includes an upper portion 114 and a base portion 112. The upper portion 114 includes a front wall 116, side walls 118 and a lip 120. The base portion 112 includes side portions 158 with vertically-extending corrugations 160. The base portion 112 includes a rearward portion 162 to which the wheels 64 and axle 66 are mounted.

The roll-out cart 110 includes an alternate front flange 124 and alternate lower gussets 128. Either front flange 24, 124 and lower gussets 28, 128 could be used with either roll-out cart 10, 110.

FIG. 11 is a section view of the roll-out cart 110. The floor 192 is substantially lower than the floor 92 of the FIGS. 1-9, such that the upper portion 114 of the roll-out cart 110 is larger than in the first embodiment. The corrugations 160 extend continuously into the upper portion 114 and include nesting ribs 161. Similarly, as shown in FIG. 12, the corrugations in the front wall 168 extend continuously into the upper portion 114 of the roll-out cart 110. Nesting ribs 169 on the interior surfaces of the corrugations limit nesting by a similar roll-out cart 110 (or roll-out cart 10).

Generally, aside from the front flange 24, 124, which could be used with either roll-out cart 10, 110, the only difference between the roll-out carts 10, 110 is the position of the floor 92, 192. Optionally, the two roll-out carts 10, 110 could be made in the same mold, with different inserts added to both mold halves to produce the two different floor 92, 192 positions.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A container comprising:

a single bottom wall;

a front wall, a rear wall and a pair of opposed side walls extending upwardly from a perimeter of the bottom wall and defining an upper interior, the bottom wall contacting each of the front wall, the rear wall and the pair of opposed side walls, the rear wall taller than the front wall, each of the side walls having an upper edge angled downwardly from the rear wall to the front wall;

at least one support extending upwardly and rearwardly from the rear wall, the at least one support extending above the rear wall;

a handle mounted to an upper end of the at least one support;

a base portion at least partially defined by a plurality of base walls extending downwardly from the bottom wall, the base walls at least partially defining the bottom of the container, the bottom wall being positioned above the lowermost portions of the base walls; the base walls including side portions each having a plurality of corrugated portions below the sidewalls; and wherein the bottom wall completely separates the upper interior from the base portion.

2. The container of claim 1 further including a lid hingeably mounted to the handle such that the lid pivots about a point located above the rear wall, the lid being pivotable between an open position and a closed position on the upper edges of the side walls and on the front wall.

3. The container of claim 2 further including at least one arm pivotably connecting the handle to the lid.

4. The container of claim 2 wherein the lid includes a pair of side reinforcement portions having upwardly convex upper surfaces.

5. The container of claim 4 wherein the lid includes a generally planar center portion between the side reinforcement portions.

6. The container of claim 2 wherein the lid includes a peripheral flange for abutting the upper edges of the side walls and the front wall in the closed position, the lid further including a handle at a front end of the lid, the handle including a rib spaced upward from the peripheral flange.

7. The container of claim 1 wherein the plurality of base walls include lower edges for supporting the container on a floor.

8. The container of claim 7 further including a pair of wheels mounted to the base walls below the rear wall.

9. The container of claim 8 wherein the base walls define a front recess, a handle extending through the recess and two of the plurality of walls.

10. The container of claim 8 further including an axle extending through at least two of the plurality of base walls, the wheels mounted to the axle.

11. The container of claim 7 further including a plurality of cross ribs extending downwardly from the bottom wall and extending between the base walls.

12. The container of claim 7 wherein the lower ledges are defined in a plane, and wherein an opening is defined between the lower ledges and in the plane.

13. The container of claim 1 further including a pair of wheels mounted to a rear portion of the base portion below the rear wall, wherein a front portion of the base portion includes the corrugated portions of the base walls and wherein the rear portion of the base portion is narrower than the front portion of the base portion.

14. The container of claim 1 wherein the side walls include corrugations aligned with and continuous with corrugations in the corrugated portions of the base walls.

15. The container of claim 1 further including a lip extending outwardly and downwardly from the upper edges of the side walls.

16. The container of claim 15 wherein the lip includes an outer flange continuous with an outer wall of the at least one support.

17. The container of claim 1 wherein the upper edges of the side walls are angled downwardly toward the front wall at an angle more than five degrees.

18. The container of claim 17 wherein the upper edges of the side walls are angled downwardly toward the front wall at approximately ten degrees.

19. The container of claim 18 wherein the at least one support extends upwardly and rearwardly at approximately sixty degrees.

20. The container of claim 1 wherein the at least one support includes at least two supports, the container further including at least one gusset extending upwardly and rearwardly from an upper portion of the rear wall to the handle.

21. The container of claim 1, further including that all objects stored in the container are supported above the bottom wall.

22. The container of claim 1 wherein the bottom wall is flat.

23. The container of claim 22 wherein the bottom wall is continuous such that the bottom wall is uninterrupted by any opening.

24. A container comprising:

a single bottom wall;

a front wall, a rear wall and a pair of opposed side walls extending upwardly from the bottom wall and defining an upper interior, the bottom wall contacting each of the front wall, the rear wall and the pair of opposed side walls;

a base portion extending downwardly from the bottom wall, the base portion including a plurality of base walls extending downwardly from the outer periphery of the bottom wall, the base walls including side portions each having a plurality of corrugated portions below the side walls;

the plurality of base walls including lower edges for supporting the container on a floor, wherein the lower ledges are defined in a plane, and wherein an opening is defined between the lower ledges and in the plane; and wherein the bottom wall completely separates the upper interior from the base portion.

25. The container of claim 24 further including a pair of wheels mounted to the base walls below the rear wall.

26. The container of claim 25 wherein the base walls define a front recess, a handle extending through the recess and two of the plurality of walls.

27. The container of claim 25 further including an axle extending through at least two of the plurality of base walls, the pair of wheels being mounted to the axle.

28. The container of claim 24 further including a plurality of cross ribs extending downwardly from the bottom wall and extending between the base walls.

29. The container of claim 24 further including a pair of wheels mounted to a rear portion of the base portion below the rear wall, wherein a front portion of the base portion includes the corrugated portions of the base walls and wherein the rear portion of the base portion is narrower than the front portion of the base portion.

30. The container of claim 24 wherein the side walls include corrugations aligned with and continuous with corrugations in the corrugated portions of the base walls.

31. The container of claim 30 wherein the corrugations in the side walls protrude into the upper interior of the container.

32. The container of claim 31 wherein a similar container nested in the container is supportable on protruding portions of the corrugations of the side walls in the upper interior of the container.

33. The container of claim 24 wherein the each base wall includes at least three corrugations.

34. The container of claim 24, further including that all objects stored in the container are supported above the bottom wall.

35. The container of claim 24 wherein the bottom wall is even such that the bottom wall is uninterrupted by any opening.

36. The container of claim 24 wherein at least one support extends upwardly and rearwardly from the rear wall, the at least one support extending above the rear wall, and wherein a handle is mounted to an upper end of the at least one support.

37. The container of claim 24 wherein the rear wall is taller than the front wall, and wherein each of the side walls has an upper edge angled downwardly from the rear wall to the front wall.

38. A container comprising:

a single bottom wall;

a front wall, a rear wall and a pair of opposed side walls extending upwardly from the bottom wall and defining an upper interior, the bottom wall contacting each of the front wall, the rear wall and the pair of opposed side walls;

a base portion extending downwardly from the bottom wall, the base portion including a plurality of base walls extending downwardly from the outer periphery of the bottom wall, the base walls including side portions each having a plurality of corrugated portions below the side walls; and wherein at least one rib extends downwardly from the bottom wall, the at least one rib extending between at least two of the side walls.

39. The container of claim 24 wherein, when the container is in an upright resting condition, the base walls contact a floor and the bottom wall is elevated from the floor.

40. The container of claim 24 further including a pair of wheels mounted to the base walls, the wheels mounted to an axle located below the bottom wall.

41. The container of claim 38 wherein the at least one rib includes a plurality of ribs.

42. The container of claim 38 wherein the plurality of base walls include lower edges for supporting the container on a floor, the lower ledges being defined in a plane, and wherein an opening is defined between the lower ledges and in the plane.

43. The container of claim 38 wherein the at least one rib extends between at least two of the base walls.

* * * * *